United States Patent [19]

Pickering et al.

[11] 3,751,584

[45] Aug. 7, 1973

[54] TELEVISION SIGNAL TO PHOTOGRAPHIC FILM RECORDING SYSTEM

[75] Inventors: Royce D. Pickering; David M. Glassman, both of Rochester, N.Y.

[73] Assignee: Eastman Kodak Company, Rochester, N.Y.

[22] Filed: July 28, 1971

[21] Appl. No.: 166,887

[52] U.S. Cl. ....... 178/6.7 A, 178/5.4 CD, 178/7.85, 178/DIG. 28, 352/46, 355/20, 355/53

[51] Int. Cl. ........................ G03b 41/00, H04n 5/88

[58] Field of Search .................. 178/6.7 A, DIG. 28, 178/7.85, 5.4 CD; 352/38, 46; 355/122, 20, 53

[56] References Cited

UNITED STATES PATENTS

| | | | |
|---|---|---|---|
| 3,685,899 | 8/1972 | Reeds | 178/5.4 CD |
| 3,118,971 | 1/1964 | Lovell | 178/6.7 A |
| 3,511,567 | 5/1970 | DeJoux | 352/46 |
| 3,378,635 | 4/1968 | Goldmark | 178/DIG. 28 |
| 3,198,067 | 8/1965 | Gabor | 178/6.7 A |

*Primary Examiner*—Howard W. Britton
*Attorney*—Robert W. Hampton et al.

[57] ABSTRACT

An apparatus and method for recording television scenes onto photographic film in a format suitable for use in conventional optical motion picture projectors. A beam splitter is used to simultaneously record the scanning spots of a TV signal onto two adjacent frames of an intermediate, continuously running film such that two fully interlaced TV fields are recorded on every frame of the intermediate film. Selected frames from the intermediate film are then printed onto conventional photographic motion picture film in a format which can then be used in conventional optical motion picture projectors.

9 Claims, 10 Drawing Figures

ROYCE D. PICKERING
DAVID M. GLASSMAN
INVENTORS

BY Robert W. Weig

AGENT

ROYCE D. PICKERING
DAVID M. GLASSMAN
INVENTORS

BY Robert W. Weig
AGENT

FIG. 4A
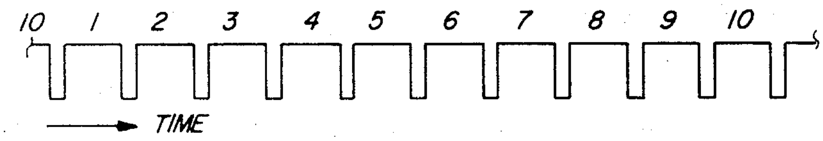
FIG. 4B
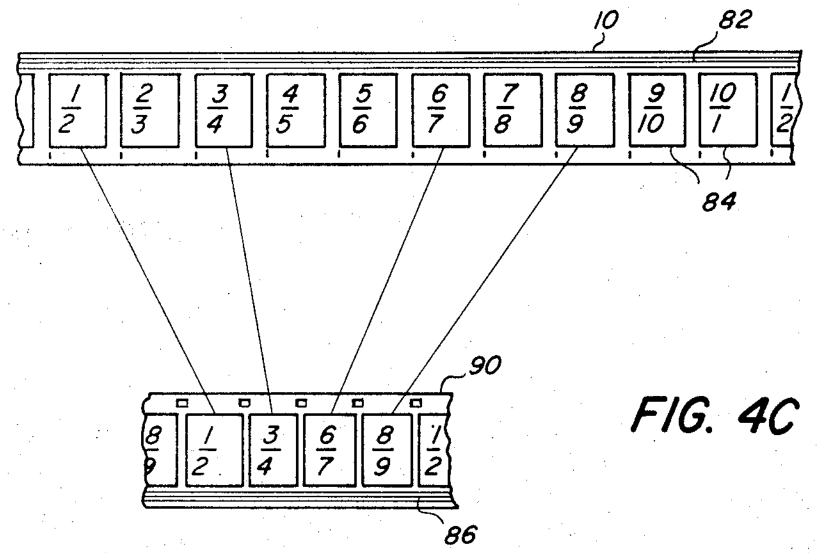
FIG. 4B, FIG. 4C
FIG. 5A
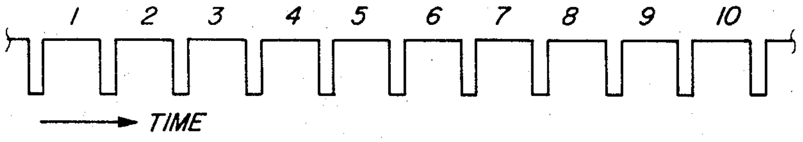
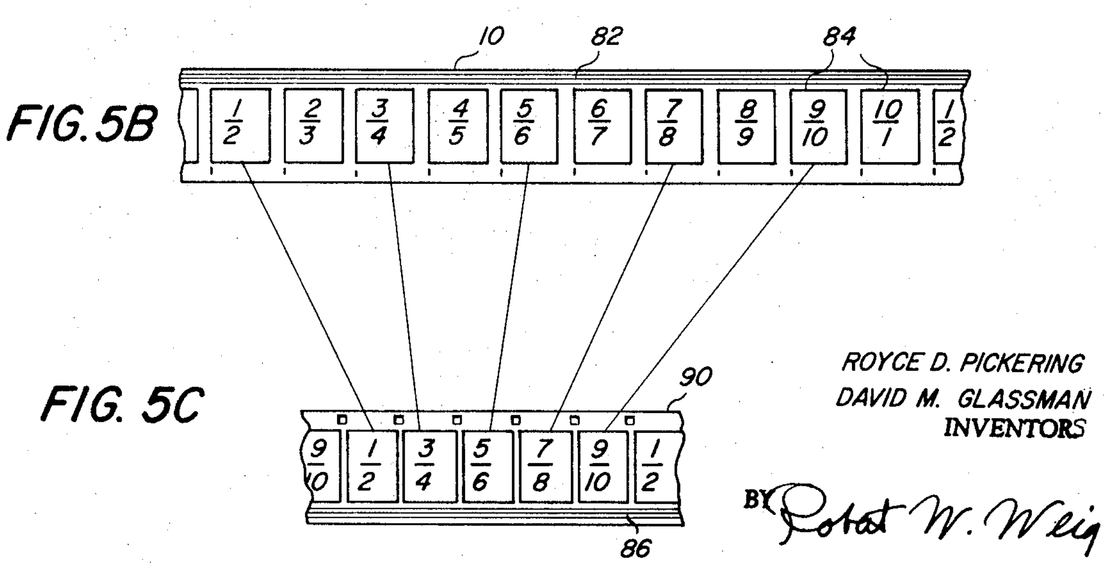
FIG. 5B, FIG. 5C
ROYCE D. PICKERING
DAVID M. GLASSMAN
INVENTORS
BY Robert W. Weig
AGENT

ROYCE D. PICKERING
DAVID M. GLASSMAN
INVENTORS

BY Robert W. Weig
AGENT

TELEVISION SIGNAL TO PHOTOGRAPHIC FILM RECORDING SYSTEM

FIELD OF THE INVENTION

The subject invention relates to a method and apparatus for converting television signals into visual and audio recordings on motion picture film, and more particularly, to a method and apparatus for optically recording images representative of television signals onto an intermediate film from which selected frames are then printed on conventional motion picture film in a format which can be used in conventional optical motion picture projectors.

BACKGROUND OF THE INVENTION

It has long been a problem in both the United States and Europe as well as other places in the world that motion picture frame rates do not match television frame rates. By the television standards of the United States, that are in general use in the television industry, the standard frame rate is 30 frames per second (fps), each frame consisting of 525 scanning lines divided between two adjacent, consecutive fields. One field contains the odd numbered scanning lines and the following field contains the even numbered scanning lines. Accordingly, 60 fields per second are scanned.

In Europe the television standard is 50 fields per second, corresponding to 25 fps. Throughout the world professional motion pictures are made to be projected at 24 fps. Thus, there is a conversion problem, particularly in the United States for transcribing television signals or television images onto motion picture film for use in conventional projectors since the frame rates of the two industries are not compatible.

Typically, the prior art systems produced television to motion picture film transcriptions with apparatus and methods incorporating mechanical shutters, electronic shutters, or other devices with inherent disadvantages and unsatisfactory results. These disadvantages chiefly arise from the particular frame frequencies and raster patterns employed at the present time in television broadcasting.

As pointed out above, the conventional practice in television broadcasting in the United States is to transmit the video signal at the rate of thirty frames per second, each of said frames consisting of a pair of interlaced fields. The field rate of sixty is utilized because of its commensurability with conventional sixty-cycle alternating current electric power frequency available in the United States.

Every field comprises a number of horizontal lines which are spaced vertically by a distance twice that which appears between lines in the final television frame. Individual fields are so located on the screen that the lines of one field fall between the lines of the other field to comprise a single frame. Due to the persistency of human vision and also the persistency of the cathode-ray screen in the television receiver, the interlaced lines fuse or blend into a single frame picture having closely spaced horizontal lines of twice the number appearing in any individual field.

The difficulties which arise in attempting to make a permanent record of television programs result from the difference in the frame rate of standard and sound motion picture apparatus and that of conventional television equipment. As above stated, the standard rate for sound motion pictures has been established at 24 frames per second. Practically all motion picture cameras and projectors are designed to operate at this rate and while they are often adjustable, they do not provide a range of adjustment sufficiently great to provide for the difference between twenty-four frames per second and thirty frames per second as used in U.S. television apparatus. Although 24 frames per second is also the standard rate for motion picture equipment in Europe, the difference in frame rate between 24 and 25 does not produce a noticeable difference in the quality of either a visual or sound record. Accordingly, the difference in frame rate does not pose as serious a problem in Europe as it does in the United States.

Another problem arises when television screen images are directly photographed which is due to the nature of the production of the television frame picture on the cathode-ray screen. This is different from the usual exposure of motion picture frames. Since the television picture is progressively written on the screen as scanning procedes, a reduction in exposure time when photographing a television screen results not in a uniform reduction of intensity in the recorded photographic image, but in deletion of some of the scanning lines. If, for instance, the shutter of a motion picture camera photographing a television screen is opened exactly at the beginning of a particular television frame, but is closed before the end of the frame period, the scanning lines in a lower region of the image recorded will be omitted. Since the standard television frame consists of two successive fields, the photographic image produced by an exposure which is longer than 1/60 of a second but shorter than 1/30 of a second has a strip of markedly reduced intensity across a portion of the picture. The image appearing within such strip consists of only the lines of the initial field.

In photographing television screen images directly, the frame rate of the motion picture cameras should correspond to that of the television frame rate, and exposure time must be such that during the open period of the shutter, the scanning spot can completely traverse the T.V. screen.

Conventional motion picture cameras produce one exposure every 1/24 of a second. Approximately one-half of the 1/24 sec. time period between one frame and the next is used, however, in moving the film from one position to the next. Obviously, during the time that the film is moved, the shutter must be closed to avoid blurring the photographic image.

One compromise solution to the two above problems, namely the differential frame rate and exposure, is to run the camera at 24 frames per second and make each "open shutter" period 1/30 of a second. It can readily be seen that such a procedure leaves 1/120 of a second in which to move the film. This 1/120 of a second "pull down" period must be shortened even more by reason of the fact that certain periods are required for the shutter to close and to open. This arrangement results in an extremely short "pull down" period which brings about additional disadvantages, including more noise and registration problems.

Yet another difficulty encountered in previous attempts at television transcription lies in the fact that when a camera frame rate of 24 frames per second is employed, every successive exposure of the film begins at a different line in the television frame. If, for example, the exposure time is 1/30 of a second, and the film rate is twenty-four frames per second, it may be assumed that the first film exposure commences at a time when the scanning spot is just beginning its downward path across the television screen. The first exposure being 1/30 of a second will include exactly one television frame, and the spot will have just completed the last line at the time the shutter closes. The shutter will then remain closed for a period of 1/120 of a second and will hereupon open to begin the exposure of the next successive frame on the film. Thus, it will be seen that the second exposure of the film will begin at a time when 1/120 of a second of the television frame then in progress has already elapsed. This means that the scanning spot is half way down the screen in the first field when the shutter opens. Theoretically, this situation may possibly be considered cured by the fact that at the end of the second film exposure the spot will again be half way down the screen, whereby to fill in the "gap" which resulted through the television frame.

A perfect matching of the various portions which make up each successive photographic image will result, however, only when the exposure time is exactly maintained. If, for instance, the exposure time is very slightly less than 1/30 of a second, a distinctly defined area of the resultant photographic image will not be exposed. If such error in the exposure time is recurring, that is continuous throughout the progress of the photography, a very disturbing horizontal bar will be produced in the final film which effect is generally referred to as "shutter bar."

Thus, it can be seen that directly photographing a television screen image onto conventional motion picture film, both operating at their respective conventional frame rates presents several problems not totally overcome by existing equipment.

Several prior art systems have been proposed and tried for recording television signals or signals representative thereof using intermediate devices before being finally recorded onto conventional motion picture film. One such system is disclosed in U.S. Pat. No. 2,622,147 to Condliffe et al, in which a television signal responsive double interlaced scanning raster impinges on a continuously moving film. Between the scanner and the film are a rotating mirror wheel and a coordinated shutter which moves to interlace two consecutive raster fields in a single area of the film. The film is perforated and is driven by a sprocketed drive wheel. It has been found that the use of sprocket driven perforated film to record television images on continuously moving film produces a flickering picture upon projection thereof since shrinkage in the film during processing and due to handling and changing physical conditions causes differences in the distance between the perforations. When such a film is projected, a discontinuous, jerking motion picture results. In addition, the television frame rate to motion picture synchronization problems are not solved. The Condliffe et al device only converts 60 fields per second to 30 fields per second which fails to match the resulting motion picture film at the standard motion picture projection rate of 24 frames per second.

One object of the present invention is to provide an improved method and apparatus for recording television signals onto photographic film in a format suitable for use with conventional optical motion picture projectors.

Another object of the present invention is to preserve the natural timing in the conversion which provides for no "speed-up" or "slow-down" in projection rates to conserve the real life timing of the television production.

One advantage of this invention is that it is useful to record television signals broadcast at both European and United States conventional frame rates onto motion picture film in a format usable in conventional motion picture projectors.

Another advantage of the present invention is that the images recorded are recorded without noise and registration problems associated with intermittent motion picture cameras having fast pull-down.

In accordance with the present invention, the apparatus and method for recording standard television signals onto photographic films in a format suitable for use in conventional motion picture optical projectors utilizes an intermediate, continuously run recording film which is interlace scanned by two simultaneous spots. To do this a beam splitter is disposed between the television signal responsive raster and the intermediate, continuously run film such that two fully interlaced TV fields are recorded on every frame of the intermediate film. Selected ones of the frames from the intermediate film are then printed onto conventional motion picture photographic film in a format which is suitable for use in conventional optical motion picture projectors.

DESCRIPTION OF THE DRAWINGS

Reference is now made to the accompanying drawings in which like reference characters designate like parts and wherein:

FIGS. 4*A*, 4*B* and 4*C* are schematic representations of the elements and steps for converting 60 fields per second, the conventional field rate in the United States for television signals, to 24 frames per second, the conventional frame rate for motion picture projectors;

FIGS. 5A, 5B and 5C are representations similar to those of FIGS. 4A, 4B and 4C, respectively, but which show conversion within the European system from a 50 field per second television signal to a 25 frame per second film rate.

DETAILED DESCRIPTION OF THE INVENTION

Figure 1:
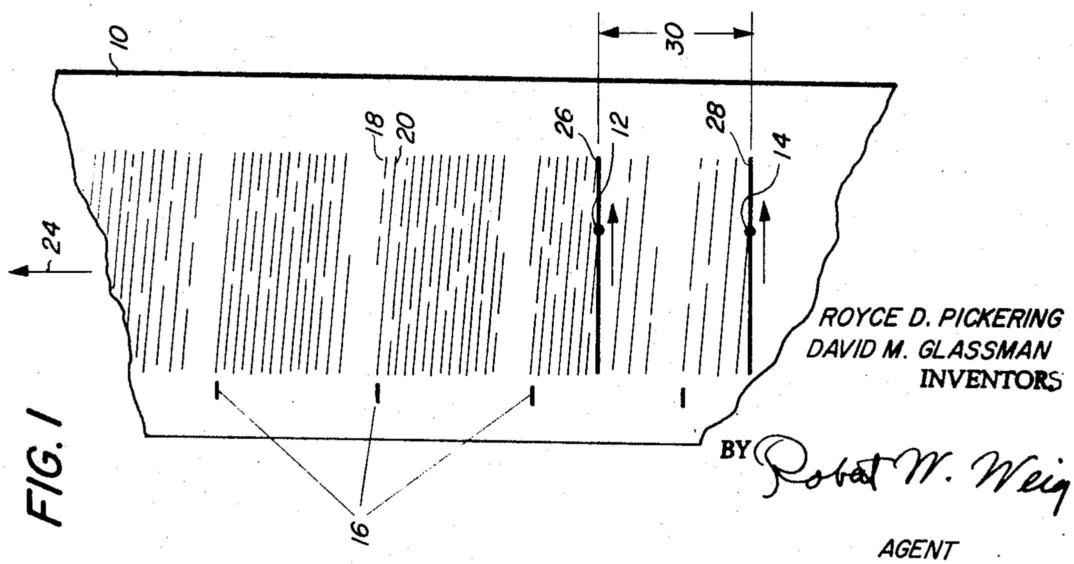
FIG. 1 is a pictorial representation of the intermediate continuously run film.

Referring now to FIG. 1, intermediate sensitized film 10, which is that used to take the television time sequential signal from the television raster, is exposed by scanning two spaced spots of light 12 and 14 in separate and parallel tracks, simultaneously, across film 10 as it continuously moves in the direction indicated by the arrow 24. Film 10 is unperforated to eliminate discontinuous, jerky picture reproduction due to film shrinkage, use and other factors. It should be noted that scan spots 12 and 14 are spaced to be simultaneously scanning two separate frames. Frame registration or fiducial marks 16 represent relative common positions on the plurality of image frames on film 10. Preferably, marks 16 are located at positions on film 10 at which initiation of frame scans by the television raster have taken place. The interlaced traces of scan spots 12 and 14 are shown as broken line 18 and solid line 20. Stationary tracks traversed by scanning spots 12 and 14 denoted 26 and 28 represent lines the spaced scan spots would trace if the film 10 were not moved during a scan. As the system operates and film 10 continuously moves, scan tracks 18 and 20 are recorded at an angle to lines 26 and 28 due to the continuous motion of film 10 during the scanning. The arrows point out the direction of scan, but those skilled in the art will realize it can be just as well carried out in the opposite direction as a matter of choice. The direction shows the conventional one for the direction of film motion.

Spots 12 and 14 are created to be of equal intensity of power and the mutual intensity is modulated by the television time sequential signal as will be disclosed further hereinbelow. During the time of one field interval in the television signal, i.e., 262.5 horizontal scans of a 525 line signal, film 10 moves the distance of the image frame pitch 30. Separation of the two scanning spot tracks 26 and 28 is precisely matched to the image frame pitch 30 in such a way that the second spot 14, in scanning a given area upon the film 10, produces an interlaced scan on the first image, which is produced by scan spot 12. The result is that intermediate film 10 has one interlaced scan image frame for every field of the television time sequential signal.

Figure 2:
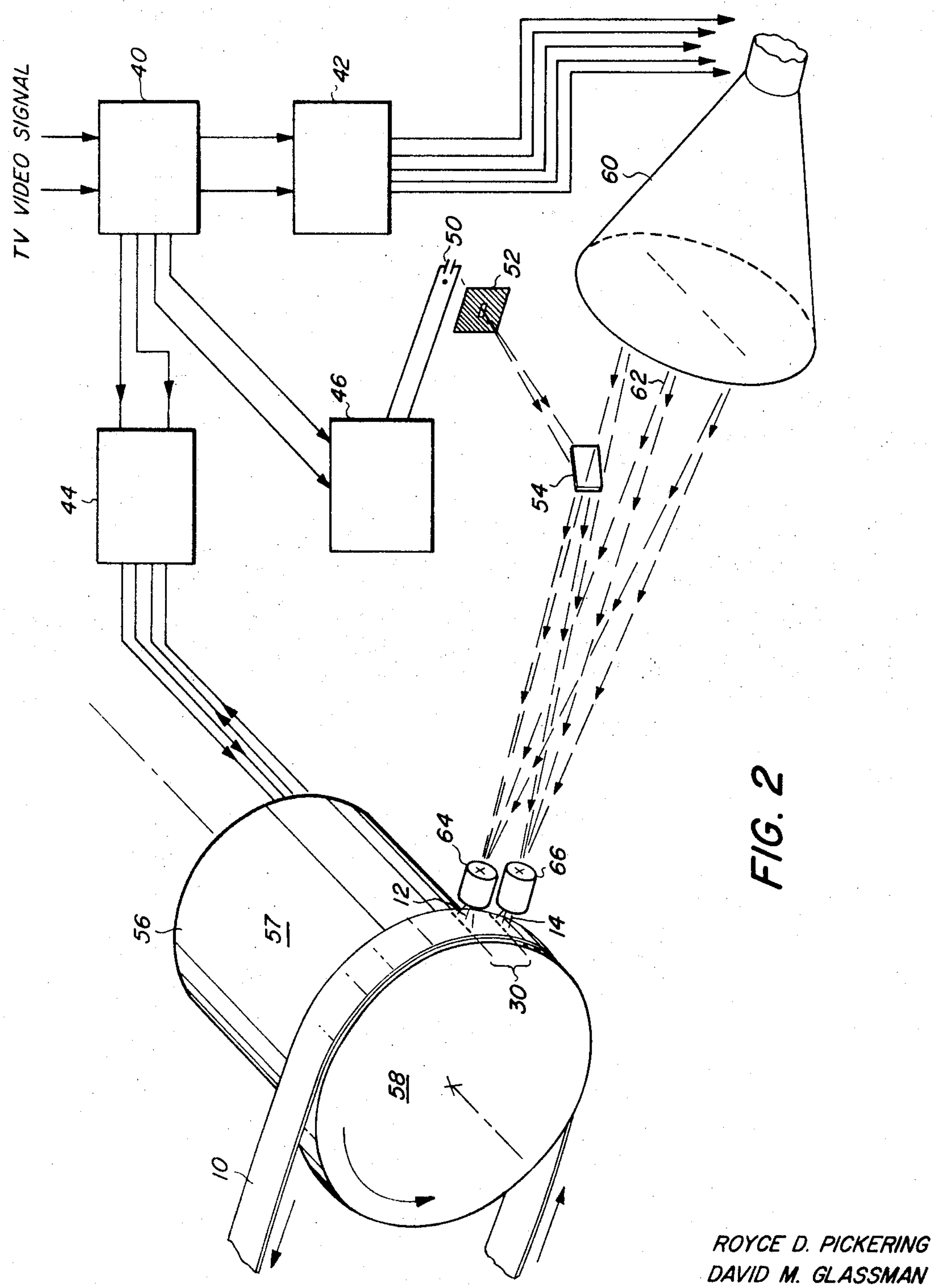
FIG. 2 is a perspective pictorial showing of a preferred embodiment for the dual spot recording of interlaced images from television signals to the intermediate continuously run film using a cathode-ray tube scanner.

Turning now to FIG. 2, a preferred embodiment of a system for exposing the intermediate photographic film 10 is shown. The television video signal to be transcribed inputs to a conventional signal processor 40, which relays horizontal synchronization and image intensity signals to cathode-ray tube drive circuits represented schematically by block 42 and which are of the conventional type well known to those skilled in the art. In addition, signal processor 40 also transmits horizontal synchronization signals to capstan motor drive and synchronization circuits 44 which are also circuits well known to those skilled in the art. Signal processor 40 transmits vertical synchronization signals to a flashlamp drive circuit 46 which controls flashlamp 50. The light from flashlamp 50 is masked by pattern mask 52 which, in combination with the flashlamp 50 and a beam deflector such as mirror 54, intermittantly transmits a flash of light onto film 10 to record thereon the frame registration marks 16 seen in FIG. 1. The exposure from flashlamp 50 of the frame registration mark 16 provides a registration reference for use in the subsequent duplication and for projection of the recorded images from intermediate film 10. It will be appreciated that flashlamp 50 is actuated only for a very short period of time so as to record a narrow registration mark 16 as shown in FIG. 1.

A capstan motor drive and synchronization circuits 44 control the capstan motor 56. Position sensor 57 indicates the position of capstan drive 58 to the capstan drive and synchronization circuits 44 such that synchronization of the television signals and the position of film 10 can be attained. Capstan drive 58 friction drives the intermediate film 10. The position sensor 57 for capstan drum 58 comprises a well known capstan rotation sensing device to allow the amount of capstan rotational motion to be controlled by the horizontal synchronization pulses of the television signals.

Disposed along the optical path and between film 10 and cathode-ray tube 60, which produces an intensity modulated scan 62, are dual objective lenses 64 and 66 which are disposed to focus two spaced scan spots 12 and 14, respectively, onto film 10. The optical axes of objective lenses 64 and 66 are positioned a distance apart equal to the desired frame pitch 30 on the intermediate photographic film 10. Lenses 64 and 66 are preferably aligned with their optical axes parallel to each other and substantially perpendicular to the frame areas of film 10 in position to be exposed.

Film 10 is advanced at a uniform rate synchronized with the television signals at a frame pitch 30 equal to the separation of the scan spots 12 and 14 as determined by the disposition of objective lenses 64 and 66 during the time allowed for the horizontal scans corresponding to one field, i.e., 262.5 scans for a 525 line United States standard or 312.5 scans for the 625 line European standard to be completed. It will be appreciated that precise control of the intensity of the two separate scan spots is accomplished to obtain high quality, interlaced images.

It is again emphasized that perforated film is not selected for use as an intermediate film 10 since the preforation spacing of standard motion picture films, due to shrinkage, is greater than the allowable variation of film advance between exposures by the two interlaced scanning spots for high quality recording and reproduction. Therefore, unperforated film is used as the intermediate recording medium.

Figure 3:
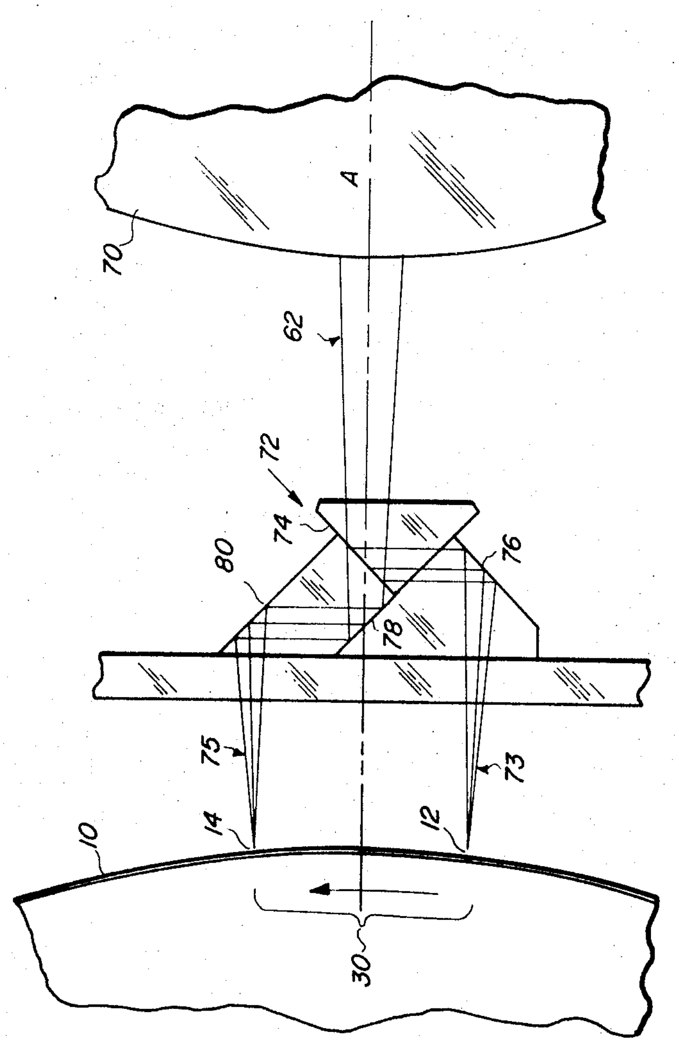
FIG. 3 is a pictorial showing of a beam divider prism assembly for producing dual scan spots.

Referring now to FIG. 3, an alternative embodiment for producing dual scan spots 12 and 14 is illustrated. The beam 62 of light rays from cathode ray tube 60 emerging from objective lens 70 enters prism assembly generally designated 72 which divides beam 62 into two beams 73 and 75 by way of a partially transmitting, partially reflecting optical surface 74. Further reflections within the prism assembly at surfaces 76, 78 and 80 bring about the emission of the two parallel beams 73 and 75 of equal intensity focussed on film 10 at a distance apart thereon equal to frame pitch 30. Prism assembly 72 is an optical device well known to those of ordinary skill in the art and no further explanation of its construction is made herein.

The television signal controlled scanning beams 62 can also be generated by a laser source in combination with a rotating mirror, prism, or other such beam deflection system. Other deflection devices such as those of the acoustooptic type as set forth in U.S. Application Ser. No. 132,955 to Spaulding et al and entitled "Acoustoptic Scanner Apparatus and Method" or other scanning device can also be used. Yet other scanners which can be utilized will be apparent to those of ordinary skill in the art including those scanners disclosed in U.S. Pats. No. 3,397,605 to Brueggemann, No. 3,532,033 to Chang, and No. 3,531,184 to Adler.

The intermediate image produced on film 10, as abovedescribed, can of course be used with special optical projection equipment capable of reproducing viewable images therefrom on a viewing screen. However, it is an object of the instant invention to convert these recorded images to a format for use inconventional optical motion picture projectors. The frame format, frame size, interframe spacing, frame rate and audio record are reformated to conventional motion picture film usefulness as set forth hereinbelow.

Figure 6:
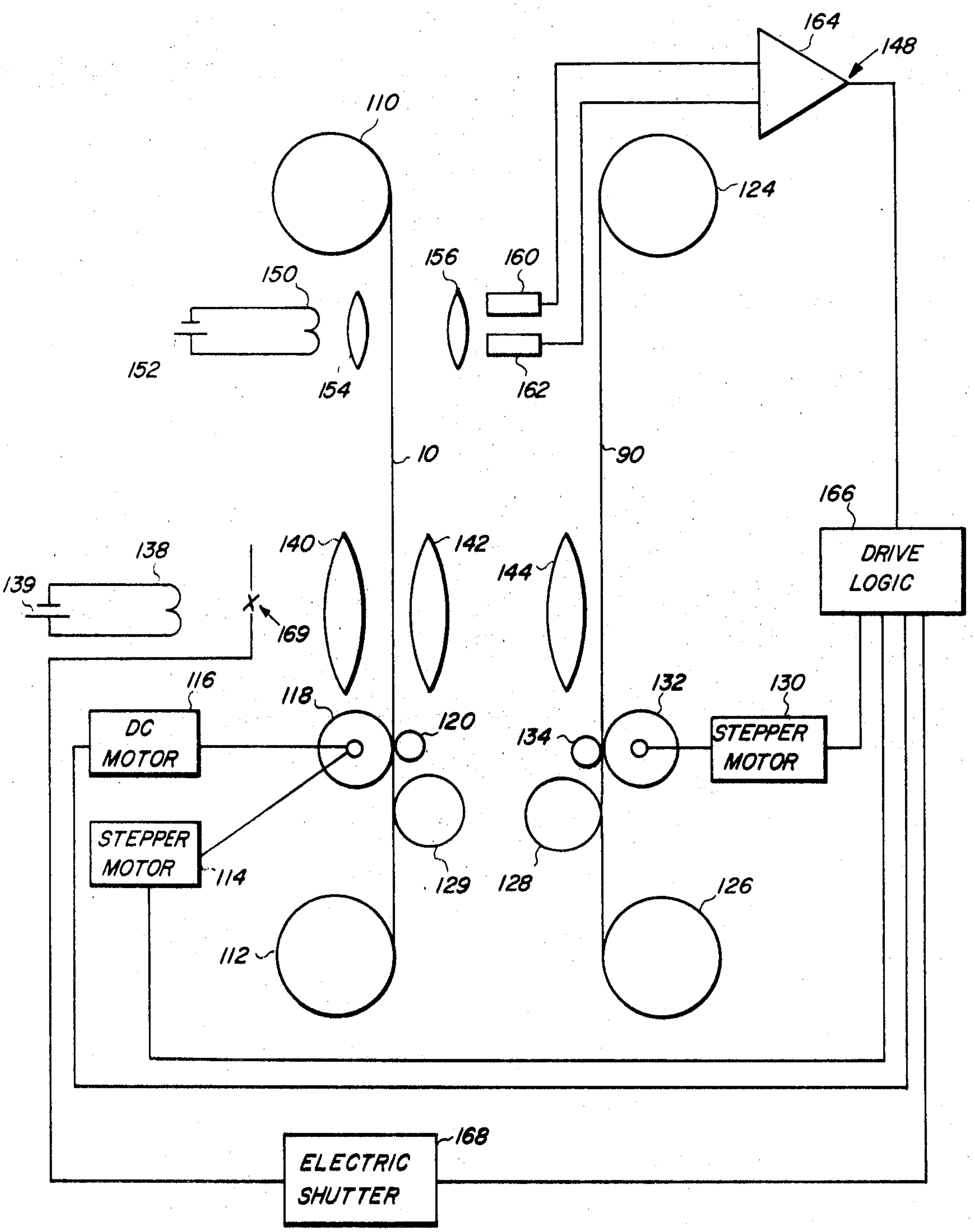
FIG. 6 is a schematic showing of a system for printing according to a desired format selected frames from the intermediate film onto motion picture film.

Referring now to FIGS. 4 and 5, the conversion from the format on the intermediate film, i.e. 60 or 50 frames per second to the format for conventional motion picture film, i.e. 24 or 25 frames per second, respectively, is shown. FIGS. 4*a* and 5*a* show graphs representing the time sequential television signals at 60 and 50 fields per second, respectively. The numbers above the square waves are field identification numbers. The upper part of the square wave represents the video signal time and the lower part, the synchronization signal. FIGS. 4B and 5B illustrate the sound track 82 and frames 84, the latter recorded on the intermediate film 10 by interlaced scanning at 60 and 50 fields per second, respectively. The fractions within each of the frames 84 are identification numbers for the television scan fields recorded on that particular frame. Frame-by-frame optical printing with the system shown in FIG. 6, hereinbelow, is done from intermediate film 10 shown in FIGS. 4B and 5B onto conventional motion picture film 90 shown in FIGS. 4C and 5C. Since film 90 is formated to move at the conventional motion picture projection rate of 24 frames per second and film 10 is formated to move at 60 frames per second, selected images from the frames on film 10 are recorded onto film 90. When this is done, the real time sequencing of frames in the two films is time-matched. Sound track 86 is also recorded onto the conventional projection film 90 from sound track 82 on film 10 so that the sound tracks relate to the projected images in a proper synchronized fashion. Sound tracks 82 and 86 may be optical or magnetic and sound track 86 is easily recorded from sound track 82 with a conventional electrical pick-up from the track 82. Since the image transfer in the recording onto conventional film 90 from intermediate film 10 utilizes intermittent film motion, the sound pick-up and record stations (not shown) on films 10 and 90 are separated from the exposure stations by free loops in film 10 as shown in FIG. 6 to allow the constant rate motion desirable for sound pick-up and recording. This type of an arrangement is common practice by those skilled in the art within the film industry in the production and projection of sound motion pictures.

In reformating, frame-by-frame optical printing a system such as that shown in FIG. 6 is used to record images in frame size, frame rate and interframe spacing as well as in audio synchronization which conform to the capabilities of standardized motion picture projectors.

It is well known that magnification in the well known optical projection components of the printer shown in FIG. 6 is adjustable to obtain the desired frame height and interframe space.

Reference is now made to FIG. 6 wherein a system for transferring a television format into a motion picture format is shown. Intermediate film 10 is mounted on feed reel 110 and take-up reel 112. A friction puck type of motor drive is controlled by stepping motor 114 and reversible, fine positioning DC motor 116. Driving puck 118 and capstan 120 frictionally engage and drive film 10 in response to the rotation of motors 114 and 116. Film 90 which is the film upon which the conventional motion picture projection format is to be printed is mounted on feed reel 124 and take-up reel 126 with free loop designated 128 which is for take-up to allow for sound track recording at a continuous film feed rate while the printing of the image from film 10 takes place at a discontinuous feed rate. Thus, free loop 129 in film 10 and free loop 128 in film 90 by providing take-up slack allow the printing station to be run in a stepping fashion while the simultaneous recording of the sound track is done with continuously moving portions of the films.

Stepping motor 130 through a friction puck type drive apparatus comprising driving puck 132 and free running capstan 134 frictionally drives film 90. Lamp 138 powered by any well known source 139 supplies the light for printing images from film 10 onto film 90 through projection optics which are preferably a light collimating lens 140 and objective lenses 142 and 144, although equivalent systems will be apparent to those skilled in the art. Motors (not shown) keep the films 10 and 90 under constant tension by actin on takeup and supply reels 110, 112, 124 and 126.

Fine positioning circuit 148 comprises a light source 150 supplied with power by any well known means 152 with collimating and objective lenses 154 and 156, which project light from lamp 150 onto two photocells 160 and 162, that are closely positioned so as to be responsive to the position of the image of frame registration mark 16 falling thereon. When the position of the mark is off from center between the two cells i.e. the null position, an amount sufficient to be detectable to the eye to be viewing a projection of theprint being made, an output from the comparator amplifier 164 representative of the direction and amount of displacement results. When the frame registration mark is centered between photocells 160 and 162 the output of comparator amplifier 164 will be zero which represents the null position. Thus, if frame registration mark falls more on either cell 160 or 162, the output of comparator amplifier 164 will reflect this displacement in distance as well as in direction. Comparator amplifier 164 outputs to drive logic 166, which among other things fires the electronic shutter control 168 which actuates electronic shutter 169 to expose film 90 to the image on film 10. Thus, a controlled amount of light from lamp 138 is projected through film 10 and the projection optics onto film 90. Drive logic 166 actuates electronic shutter 169 only when the frame registration mark is in the null position, in addition to being responsive to the direction and amount of frame registration mark displacement relative to a position of center for centering purposes. In this manner, drive logic 166 controls the bi-directional DC motor 116 to position film 10 when it is out of position in minute amounts in either direction in order to correctly center the frame to be printed. Drive logic 166 also controls stepper motors 114 and 130. Stepper motor 130 is controlled such as to advance one frame after every frame exposure on film 90. Stepper motor 114 is controlled so as to skip a desired number of frames between printings in accordance with desired program sequences such as those represented in FIGS. 4B, 4C, 5B and 5C. For example, drive logic 166 advances stepper motors 116 and 130 to advance films 10 and 90 from prior, or the initial printing positions to the following frame positions to be printed from film 10 onto film 90. If the frame registration mark stops in the null position the shutter 169 is actuated and a frame is printed. If the frame registration mark is not quite in the null position, drive logic 166 actuates bi-directional motor 116 an amount to correctly position the film 10 frame for printing. The frame is then printed. This procedure is carried on et seq. to reformat the 50 or 60 frames per second format to 25 or 24 frames per second format respectively.

Thus, a system for recording for conventional optical motion picture projection from television signals has been shown, wherein an intermediate, continuously run recording film is interlace scanned by two, simultaneously produced, spots of equal intensity modulated by the television signals such that two fully interlaced TV fields are recorded on every frame of the intermediate film. Selected frames from the intermediate film are then printed onto conventional motion picture film to provide a format which is suitable for projection in conventional optical motion picture projectors.

This invention has been described in detail with particular reference to the preferred embodiments thereof, but it will be understood that variations and modifications can be effected within the spirit and scope of the invention.

We claim:

1. An apparatus utilizing a continuously run intermediate recording media for transcribing images representative of television signals onto photographic film in a format suitable for use in conventional motion picture projectors, said apparatus comprising:

means for producing interlaced scanning spots in response to said television signals;

means for recording said interlaced scanning spots simultaneously onto two adjacent frames of said intermediate media thereby recording two interlaced television fields on every frame of said media; and means for recording selected ones of said frames from said media onto said photographic film in a format suitable for use in conventional motion picture projectors.

2. The invention of claim 1 wherein the intensities of said interlaced scanning spots are modulated by said television signals.

3. The invention of claim 1 wherein said producing means comprises means for emitting two interlaced scanning spots of equal intensity simultaneously modulated by said television signals.

4. The invention of claim 1 wherein said means for recording said interlaced scanning spots comprises means for friction driving said intermediate recording media.

5. The invention of claim 1 wherein said producing means comprises means for originating a television raster modulated in accordance with said television signals and means operatively disposed relative to said originating means for emitting two scanning spots of equal intensity from said raster for simultaneously scanning two adjacent areas on said intermediate film.

6. The invention of claim 1 wherein said producing means comprises a television raster and two objective lenses disposed so as to focus the raster light into leading and following spots a frame pitch apart on said media such that the scan of the following spot interlaces the scan of the leading spot.

7. The invention of claim 1 wherein said producing means comprises means for scanning modulated in accordance with said television signals; means operatively disposed relative to said scanning means for emitting two scanning spots of equal intensity from the light of said scanning means, said spots being simultaneously modulated by said television signals, said emitting means comprising an objective lens and beam dividing prism assembly disposed to produce a leading and a following spot on said media a frame pitch apart such that the scan of the following spot interlaces the scan of the leading spot.

8. An apparatus utilizing an intermediate recording film for transcribing images representative of television signals onto photographic film in a format suitable for use in conventional motion picture projectors, said apparatus comprising:

means for producing a scanning beam modulated by said television signal;

means for continuously moving said intermediate film;

means for transforming said scanning beam into two interlaced scanning spots;

means synchronized with said intermediate film for directing said two interlaced spots onto said intermedaite film to form recorded images representative of said television signal onto adjacent frames thereof; and means for recording, including means for determining frames to be selected, from said intermediate film onto said photographic film in a format suitable for use in conventional motion picture projectors.

9. A method of transcribing conventional television signals onto photographic film in a format suitable for use in conventional optical motion picture projectors, utilizing a frame formatted continuously run intermediate film, the method comprising the steps of:

producing a scanning beam modulated by the television signals;

splitting the scanning beam into two interlaced scanning spots of equal intensity and spaced to simultaneously record interlaced fields onto adjacent frames of the intermediate continuously run intermediate film;

scanning the intermediate film with the interlaced scanning spots to record them thereon in frame format;

determining which frames are to be selected for transferring; and transferring the images recorded on selected ones of the frames of the intermediate film onto photographic film in a format suitable for use in conventional optical motion picture projectors.

* * * * *